United States Patent
Suessenguth

(10) Patent No.: US 9,448,991 B2
(45) Date of Patent: Sep. 20, 2016

(54) METHOD FOR PROVIDING CONTEXT-BASED CORRECTION OF VOICE RECOGNITION RESULTS

(71) Applicant: Bayerische Motoren Werke Aktiengesellschaft, Munich (DE)

(72) Inventor: Philipp Suessenguth, Sunnyvale, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 260 days.

(21) Appl. No.: 14/218,608

(22) Filed: Mar. 18, 2014

(65) Prior Publication Data

US 2015/0269935 A1 Sep. 24, 2015

(51) Int. Cl.
| | |
|---|---|
| G10L 15/00 | (2013.01) |
| G10L 15/26 | (2006.01) |
| G06F 17/27 | (2006.01) |
| G10L 15/22 | (2006.01) |
| G10L 15/18 | (2013.01) |

(52) U.S. Cl.
CPC ............. *G06F 17/273* (2013.01); *G10L 15/00* (2013.01); *G10L 15/22* (2013.01); *G10L 15/26* (2013.01); *G10L 15/1822* (2013.01)

(58) Field of Classification Search
CPC ................................ G10L 15/00; G10L 15/26
See application file for complete search history.

(56) References Cited

U.S. PATENT DOCUMENTS

| | | | | |
|---|---|---|---|---|
| 5,829,000 A * | 10/1998 | Huang | ..................... | G10L 15/22 704/240 |
| 5,875,429 A * | 2/1999 | Douglas | .................. | G10L 15/26 704/235 |
| 5,960,447 A * | 9/1999 | Holt | ......................... | G06F 17/24 704/235 |
| 5,970,460 A * | 10/1999 | Bunce | ..................... | G10L 15/22 704/270 |
| 2004/0083109 A1* | 4/2004 | Halonen | ................. | G10L 15/30 704/277 |
| 2004/0141016 A1* | 7/2004 | Fukatsu | ............ | G06F 17/30873 715/856 |
| 2007/0124057 A1* | 5/2007 | Prieto | ..................... | G10L 15/26 701/532 |
| 2010/0004031 A1* | 1/2010 | Kim | ................ | H04M 1/274525 455/566 |
| 2011/0166851 A1* | 7/2011 | LeBeau | .................. | G06F 17/273 704/9 |
| 2013/0117021 A1* | 5/2013 | James | .................. | G01C 21/362 704/235 |
| 2014/0207453 A1* | 7/2014 | Shin | ......................... | G06F 17/24 704/235 |
| 2015/0058007 A1* | 2/2015 | Kim | ........................ | G10L 15/26 704/235 |
| 2015/0269935 A1* | 9/2015 | Suessenguth | .......... | G06F 17/273 704/235 |

* cited by examiner

*Primary Examiner* — Samuel G Neway
(74) *Attorney, Agent, or Firm* — Crowell & Moring LLP

(57) ABSTRACT

Context-based corrections of voice recognition results are provided by displaying text-based result from a speech-to-text conversion operation on a display screen of an electronic client device. One or more element categories associated with corresponding portions of the text-based result are identified. Graphical icons corresponding to the element categories are also displayed on the display in areas where the corresponding portions of the text-based result are also displayed. A user selection of one of the graphical icons is then detected, and an edit operation is enabled for the portion of the text-based result associated with the selected graphical icon. An updated version of the text-based results is then displayed on the display.

18 Claims, 6 Drawing Sheets

Book a table for two at Don Leone's for me and my wife today at 7 and send her an invitation with the destination.

300

*PRIOR ART*

METHOD FOR PROVIDING CONTEXT-BASED CORRECTION OF VOICE RECOGNITION RESULTS

FIELD OF THE INVENTION

The present invention relates generally to digital voice recognition, and more particularly to providing context-based corrections of voice recognition results using an electronic client device.

BACKGROUND OF THE INVENTION

Current speech-to-text conversion operations, such as would be performed by generally available voice recognition software, provide only a continuous text block in which individual words may be editable. However, it will not be apparent to the user why an error may have been made because it is unclear in what context individual words were understood by the conversion engine (e.g., interpreted as a street name when a restaurant name was intended). It therefore also remains unclear how best to correct individual errors, or for the user to adapt the manner in which they utilize the voice recognition software in the future.

Accordingly, there is a need for providing context-based corrections of voice recognition results such that the user gains a better understanding as to why certain speech input may have been incorrectly interpreted, and thereby enable the user to adapt future speech input accordingly. Moreover, it is further desirable to enable the user to correct the text-based results in a manner which indicates the context in which the error occurred, thereby facilitating text editing operations.

SUMMARY OF THE INVENTION

Disclosed and claimed herein is a method, electronic client device and computer program product for providing context-based corrections of voice recognition results using an electronic client device. In one embodiment, the method includes displaying, by the electronic client device on a display, a text-based result from a speech-to-text conversion operation, and then identifying, an element category associated with a portion of the text-based result. The method further includes displaying, on the display, a graphical icon corresponding to the element category in an area of the display corresponding to where the portion of the text-based result is also displayed. Thereafter, the method also includes detecting a user selection of the graphical icon, enabling, in response to the user selection, an edit operation to be performed on the portion of the text-based result associated with the graphical icon, and finally displaying an updated version of the result based on said edit operation.

Other aspects, features, and techniques of the invention will be apparent to one skilled in the relevant art in view of the following description of the exemplary embodiments of the invention.

DETAILED DESCRIPTION OF THE EXEMPLARY EMBODIMENTS

Figure 1:
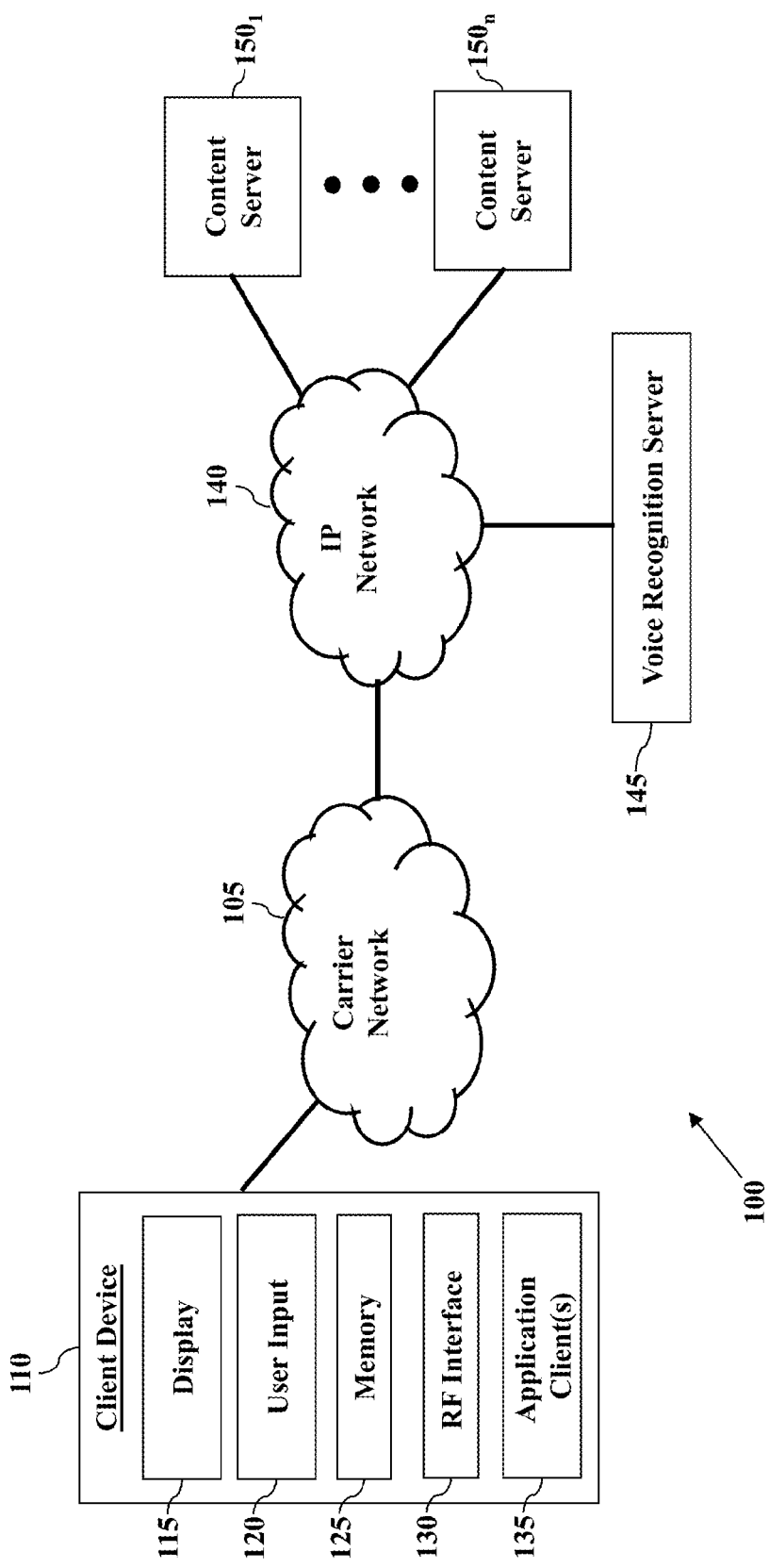
FIG. 1 illustrates a communication system in accordance with an embodiment of the invention.

The present disclosure relates generally to digital voice recognition, and more particularly to providing context-based corrections of voice recognition results using an electronic client device.

One aspect of the invention is to provide context-based corrections of voice recognition results. This is accomplished by first displaying text-based result from a speech-to-text conversion operation on a display screen of an electronic client device. One or more element categories associated with corresponding portions of the text-based result may then be identified, and graphical icons corresponding to the element categories may then further be displayed on the display in areas where the corresponding portions of the text-based result are similarly displayed.

Another aspect of the following disclosure is to detect a user selection of one of the graphical icons and, in response, enable an edit operation for the portion of the text-based result associated with the selected graphical icon. An updated version of the text-based results may then be displayed on the display. Additional aspects, features, and details corresponding to the above aspects of the invention are set forth below.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

The term "server" or "backend server" means a functionally-related group of electrical components, such as a computer system in a networked environment which may include both hardware and software components, or alternatively only the software components that, when executed, carry out certain functions. The "server" or "backend server" may be further integrated with a database management system and one or more associated databases.

The term "speech-to-text" means the operation or functionality of using speech-based data input to generate a corresponding text-based data output. Speech-to-text operations are generally carried out using voice recognition software, which may be executed locally by a user electronic device, or may be performed partly or entirely by voice recognition software executing on a backend server.

FIG. 1 depicts a communication system 100 in which one or more aspects of the invention may be implemented. In particular, communication system 100 is depicted as including a carrier network 105 which provides wireless communications services to at least one client device 110. The carrier network 105 supports at least one wireless communications protocol such as Global System for Mobile (GSM) communications, General Packet Radio Service (GPRS), Code Division Multiple Access (CDMA) or Wideband CDMA (WCDMA). The client device 110 may be any electronic device adapted to communicate with the carrier network 105, such as a cellular telephone, smartphone, tablet, handheld computer, vehicle dialog system, etc.

The client device 110 includes at least a display 115 and a user input 120, memory 125, an RF interface 130 and may include one or more application clients 130, which in one embodiment comprises one or more software modules executable by a processor (not shown) of the client device 110. The RF interface 130 performs the function of transmitting and receiving RF communications from a wireless network, such as network 105 of FIG. 1.

While in one embodiment, the display 115 may be a liquid crystal display (LCD), it should equally be appreciated that any other type of display consistent with the principles of the invention may be used. The user input 120 may include one or more buttons, keys or actuators, such as a rotary-type actuator controller, remote X-Y pointing device, trackpad, glance control, keypad, number pad, keyboard or any other collection of individual keys, buttons or actuators configured to position a focus (cursor) and to receive a corresponding user selection. In another embodiment, the user input 120 may be integrated with the display 115 in the form of a touchscreen, as is generally known in the art of consumer electronics.

In operation, the application client(s) 135 may facilitate the display of a graphical user interface (GUI) on the display 115 via which a user may experience online content, environments and/or services. In one embodiment, the application client(s) 135 may include a speech-to-text conversion application which may be configured to interact with a voice recognition server 145 to perform speech-to-text conversion operations, as is generally known in the art. It should further be appreciated that the application client(s) 135 may be used as or otherwise incorporated with an operating system interface, an application interface, a web browser interface or an interface to other environments in which there is user interaction.

Continuing to refer to FIG. 1, one application client(s) 135 may also be adapted to enable the client device 110 to request content from one or more optional content servers $150_1$-$150_n$, which may be connected to the carrier network 105 through an Internet Protocol (IP) network 140 (e.g., the Internet). In certain embodiments, the content may comprise graphical content that can be used to enhance the text-based results provided by the aforementioned speech-to-text conversion application.

Figure 2:
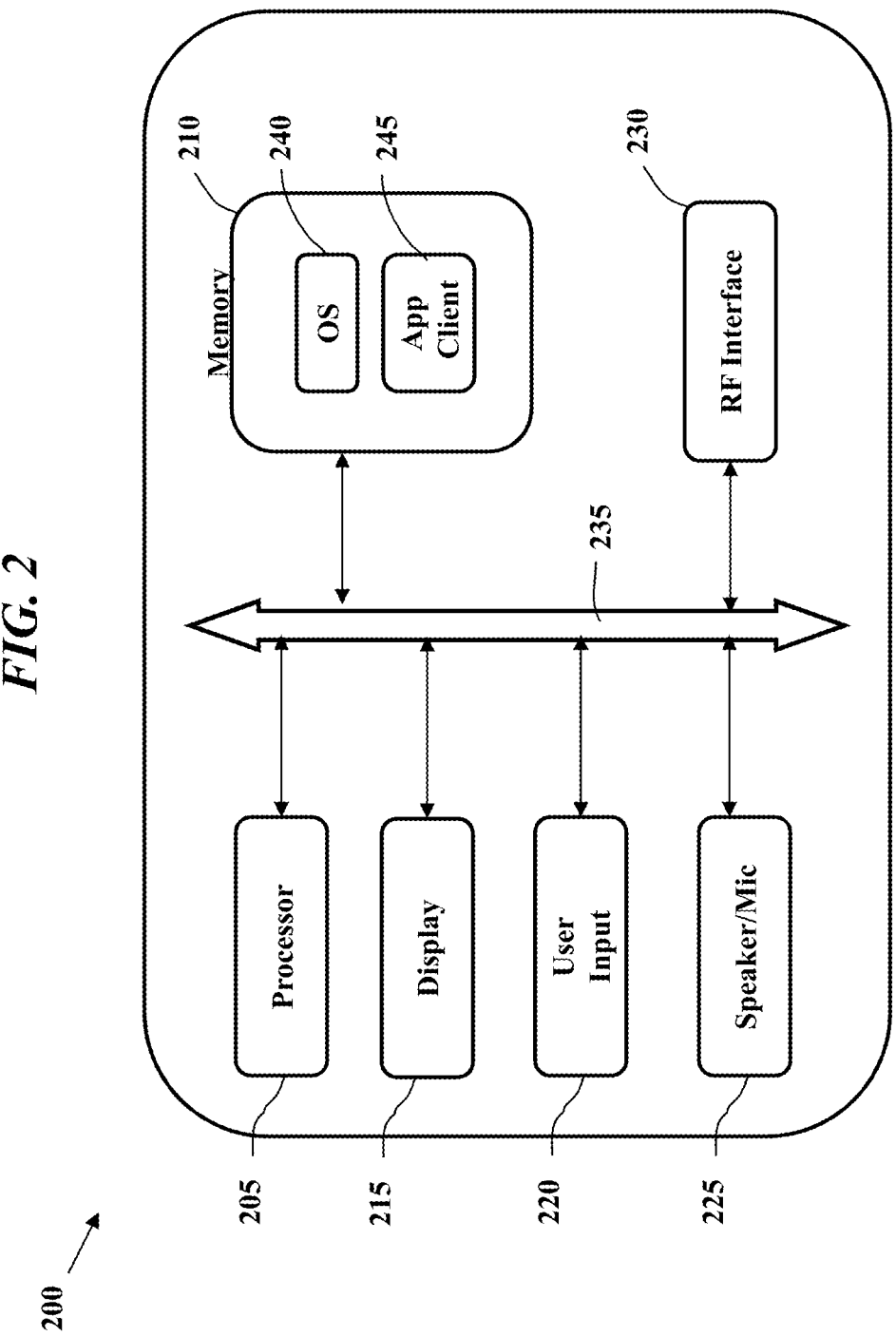
FIG. 2 illustrates a simplified schematic of a client device in accordance with an embodiment of the invention.

Referring now to FIG. 2, depicted is a simplified schematic of a client device capable of implementing one or more embodiments of the invention. In the embodiment of FIG. 2, client device 200 has a processor 205, a memory 210, a display 215, a user input device 220, a speaker/microphone 225 and an RF interface 230 for transmitting and receiving RF communications from a wireless network (e.g., network 105 of FIG. 1), all interconnected by bus 235. The processor 205 may be a general processor, a digital signal processor, an application specific integrated circuit, digital logic device, an analog processor or other now known processing circuit.

With respect to the user input device 220 it may be implemented using a keypad, such as a push-button dialing pad, a keyboard or the like. The display 215 may be an LCD or any other type of display commonly used in consumer electronic devices. It should further be appreciated that the display 215 may be touch-sensitive, such that it would also serve the function of user input device 220. The speaker/microphone 225 may be used to provide and receive verbal communications and/or tones to provide speech-based input to a speech-to-text application, for example. In another embodiment, the speaker/microphone 225 may comprise integrated speaker and microphone circuitry.

Data transmissions and application executions may be conducted by the client device 200 under the control of an operating system (OS) 240 and/or other application programs running on the client device 200, such as an application client (App client) 245. In one embodiment, the App client 245 may comprise the aforementioned speech-to-text application. In certain embodiments, the speech-to-text application may function by first capturing voice information provided by a user via the speaker/mic 225 and transmitting corresponding information to a backend server, such as the voice recognition server 145 of FIG. 1, that is representative of the captured voice information. The backend server may then carry out the actual speech-to-text conversion operation. Once that conversion operation is complete, the speech-to-text application may then be further configured to receive a text-based result from the backend server, and to display those results to the user via display 215. Although not necessarily pertinent to the scope of the disclosure, it should be appreciated that other application programs may also be stored in memory 210, such as phone dialer programs, email programs, scheduling programs, Internet browser programs, word processing programs, spreadsheet programs, instant messaging programs, etc.

Figure 3:
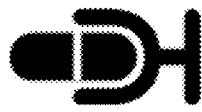
FIG. 3 depicts a text-based result of a prior art voice recognition operation.

Referring now to FIG. 3, depicted is a graphical display 300 of exemplary prior art text-based results produced by a speech-to-text conversion operation, such as would be performed by generally available voice recognition software. In short, the result of the speech-to-text conversion operation is presented as a continuous text block in which individual words may be editable. However, it will not be apparent to the user why an error may have been made because it is unclear in what context individual words were understood (e.g., understood as a street name when a restaurant name was intended). It therefore also remains unclear how best to correct individual errors, or for the user to adapt the manner in which they utilize the voice recognition software in the future.

Figure 4A:
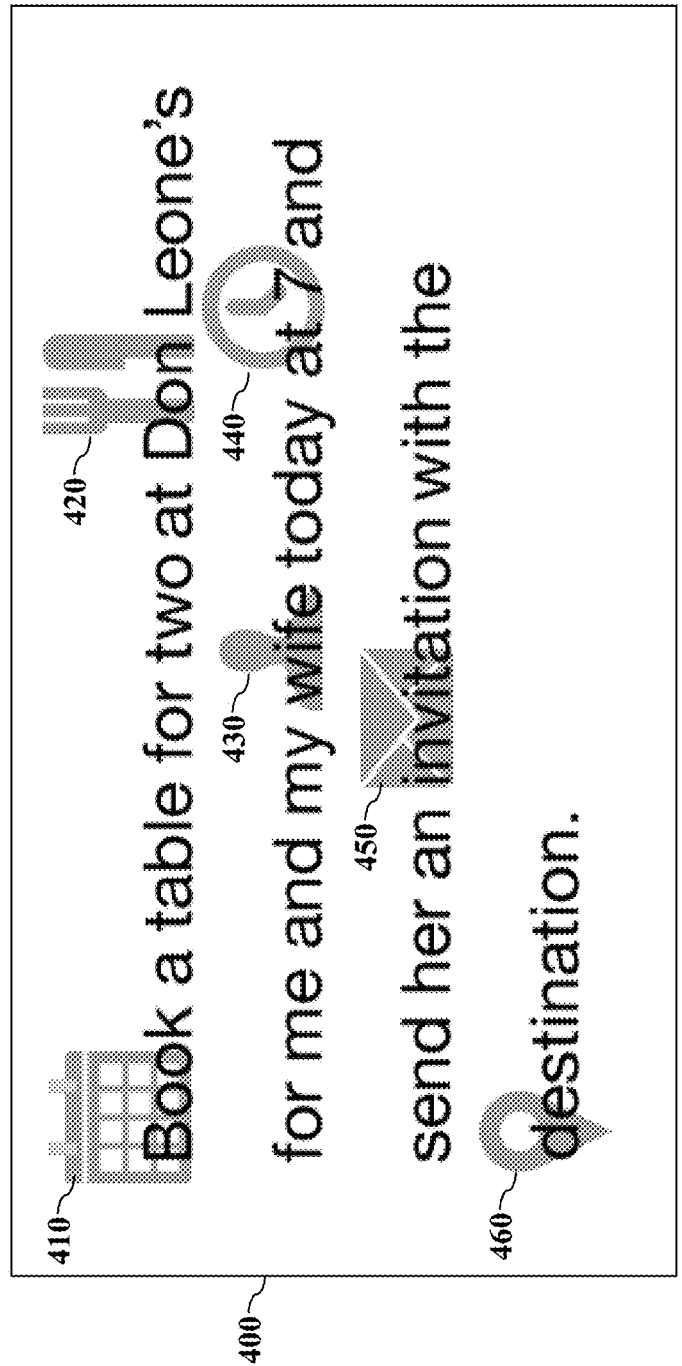
FIGS. 4A-4B depict graphically enhanced text-based results of a voice recognition operation carried out in accordance with the principles of the invention.

Referring now to FIG. 4A, depicted is a graphical display 400 of the same text-based results of FIG. 3 produced by the same speech-to-text conversion operation, but further being graphically enhanced in accordance with the teachings of the invention. In a preferred embodiment, the graphical display 400 is presented on a display of an electronic client device, such as the electronic client device 110 of FIG. 1 or 200 of FIG. 2.

As specifically shown in FIG. 4A, and as will be described in more detail with respect to the process of FIG. 5 below, the text-based results from the speech-to-text conversion operation are graphically enhanced with graphical icons 410-460 which each correspond to an identified element category corresponding to one or more words of the text-based result. As shown in FIG. 4A, the graphical icons 410-460 may be displayed in an at least partially overlapping manner with the portion of the text-based result to which it relates.

In the particular example of FIG. 4A, the manner in which the word "Book" is used is understood to correspond to an element category for an event 410, while the name "Don Leone's" is understood to correspond to an element category for a restaurant 420 based on one or more words around the same (e.g. "table for two"). Similarly, element categories for a contact 430, a time of day 440, a message 450 and a navigation destination 460 are each additionally identified based on which terms were used and the context in which they appear.

Figure 4B:
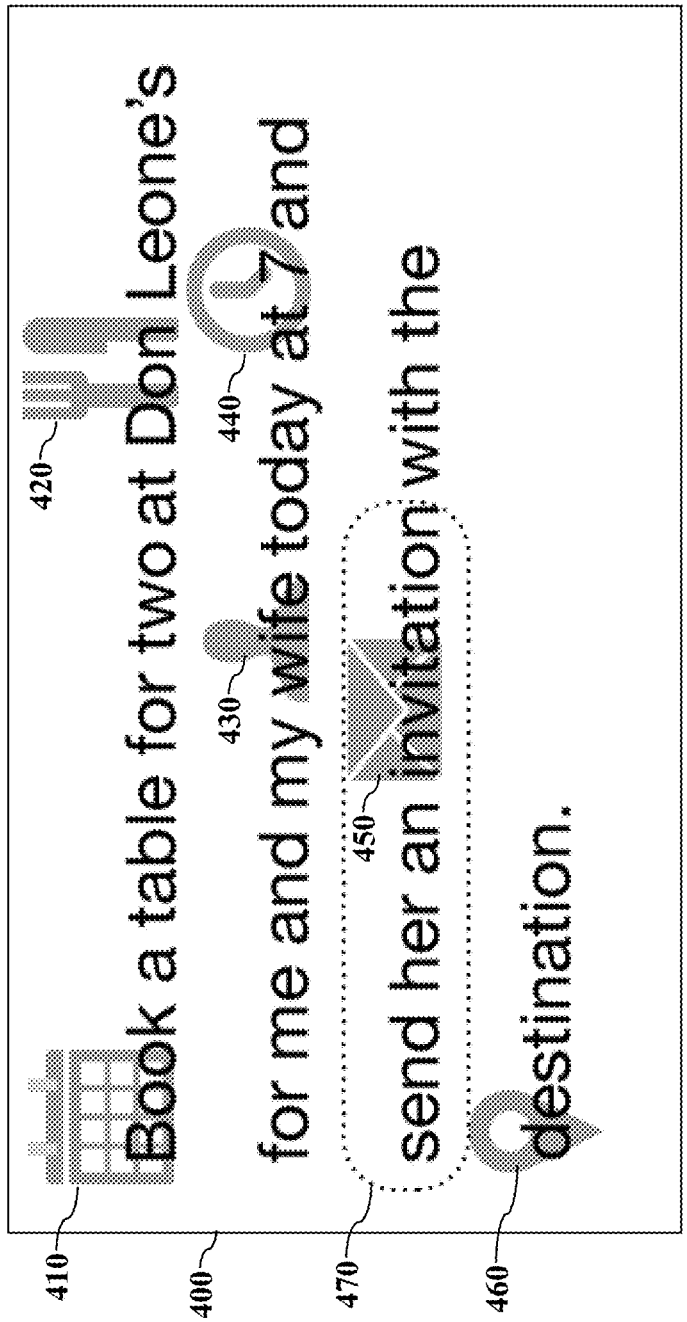

Referring now to FIG. 4B, depicted is the graphical display 400 of FIG. 4A, but in this case the graphical display 400 is depicted after the user has selected the graphical icon 450, such as by using a finger gesture on the display in an area corresponding to the graphical icon 450. In response to such a user selection, an edit operation may be enabled for the portion of text-based results corresponding to the graphical icon 450 (e.g., area 470 of FIG. 4B).

Figure 5:
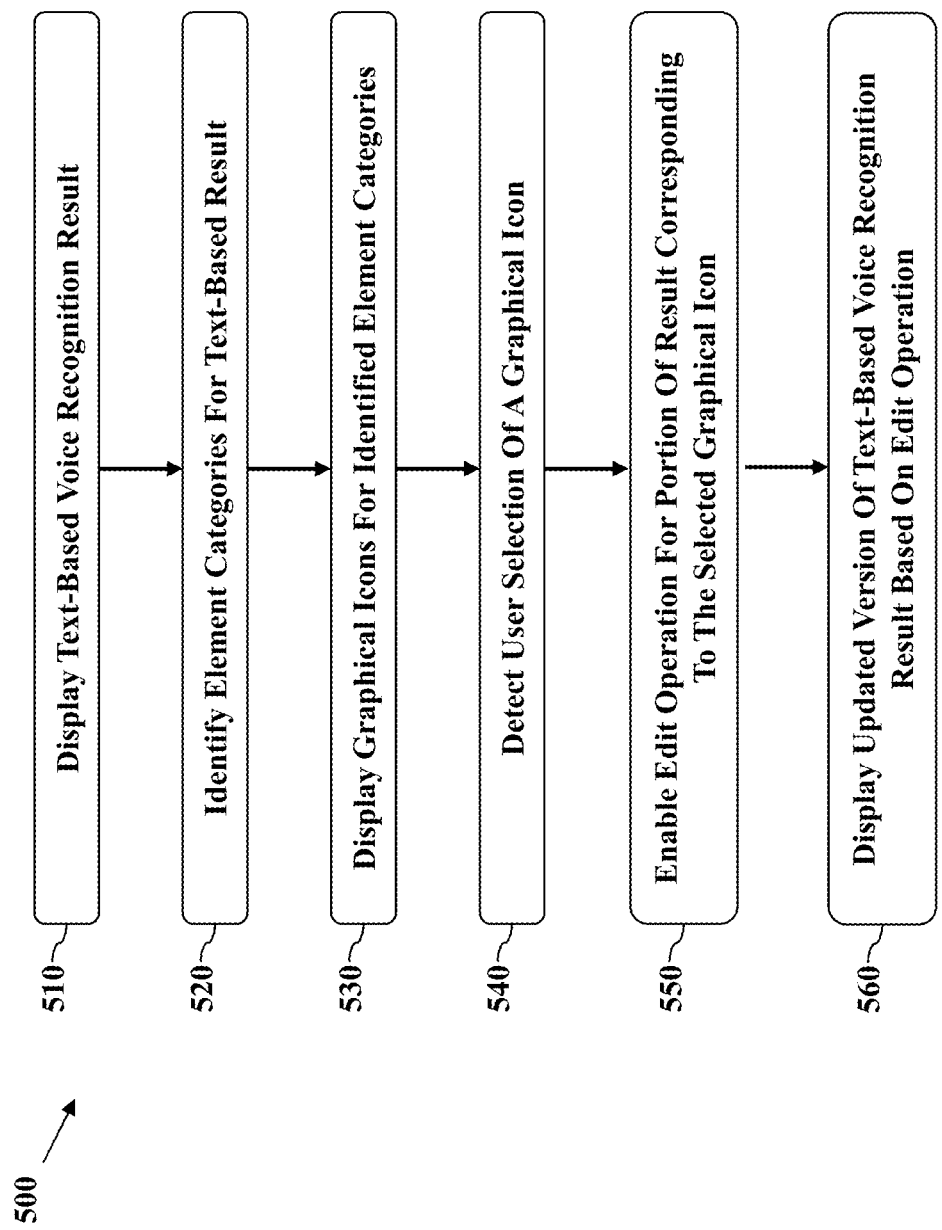
FIG. 5 is a process for providing context-based corrections of voice recognition results using an electronic client device according to one embodiment of the invention.

Referring now to FIG. 5, depicted is one embodiment of a process for carrying out one or more aspects of the invention using an electronic client device, such as device 110 of FIG. 1 or 200 of FIG. 2. Process 500 begins at block 510 with the display of text-based results from a speech-to-text conversion operation, such as the graphical display 400 of FIG. 4A above. In a preferred embodiment, the text-based results are presented on a display of an electronic client device, such as the electronic client device 110 of FIG. 1 or 200 of FIG. 2.

Following the display of the text-based results, process 500 may continue to block 520 where at least one element category within a portion of the text-based results may be identified. In one embodiment, the operation of identifying element categories contained within the text-based results of a speech-to-text operation may be carried out by first storing a plurality of element categories, along with a plurality of recognized words and phrases corresponding to the plurality of element categories, in a memory of an electronic client device (e.g., electronic client device 110 of FIG. 1 or 200 of FIG. 2). Then, the words comprising the text-based result may be parsed to determine if at least one of the recognized words or phrases is contained in the text-based result. Any such recognized words or phrases may then be used to perform a lookup operation of the plurality of element categories. Finally, individual element categories may be identified in response to the lookup operation producing a match between one of the plurality of element categories stored in the memory and any of the recognized words or phrases found in the text-based results.

Alternatively, the operation of identifying the element categories may be carried out by a backend server (e.g., content server(s) 150) to which information representative of the text-based results may be transmitted (e.g., over network 105), and from which any identified element categories may be received.

Once the element categories have been identified within the text-based results, process 500 may continue to block 530 where the text-based results are graphically enhanced by displaying, on the display, graphical icons for each of the identified element categories within an area of the display corresponding to where the corresponding portion of the text-based result is also displayed. By way of example, the graphical icons 410-460 of FIG. 4A each correspond to an identified element category corresponding to one or more words of the displayed text-based result. It should be appreciated that the graphical icons 410-460 may be displayed in an at least partially overlapping manner with the corresponding portion of the text-based result.

Continuing to refer to FIG. 5, process 500 may then continue to block 540 where a user selection of one of the displayed graphical icons may be detected. The user selection may be provided in the form of a finger gesture which involves contacting the touchscreen display in an area corresponding to the selected graphical icon. Alternatively, the user selection may be provided using one or more buttons, keys or actuators, such as a rotary-type actuator controller, remote X-Y pointing device, trackpad, glance control, keypad, number pad, keyboard or any other collection of individual keys, buttons or actuators configured to position a focus (cursor) and to receive a corresponding user selection.

In response to detecting the user selection of block 540, process 500 may then continue to block 550 where an edit operation may be enabled, whereby the enabled edit operation is to be performed on the portion of the text-based result associated with the selected graphical icon. For example, the edit operation may comprise activating an area of the touchscreen display for text entry (e.g., area 470 of FIG. 4B), wherein the area contains the portion of the text-based results that is to be made editable. Alternatively, it should be appreciated that the edit operation may comprise positioning a focus (cursor) on the area of interest using one or more buttons, keys or actuators, such as a rotary-type actuator controller, remote X-Y pointing device, trackpad, glance control, keypad, number pad, keyboard or any other collection of individual keys, buttons or actuators configured to position such a focus (cursor) and to receive a corresponding user selection. Regardless of the form of input, during the edit operation other portions of the text-based results that are outside such an area (e.g., area 470 of FIG. 4B) may remain uneditable until and unless another graphical icon is subsequently selected.

Finally, process 500 concludes with the displaying, on the display, of an updated version of the result based on the edit operation (block 560). Once any desired editing of the text-based results has been completed, the user may then proceed to transmit an electronic message having the updated version of the text-based result.

By enriching the text-based results with graphical indications as to what the understood context for particular words and/or phrases may be, the user gains a better understanding as to why certain speech input may have been incorrectly interpreted, and thereby enable the user to adapt future speech input accordingly. Moreover, this category-based graphical indications further enable the user to correct the text-based results on an individual-element basis, which is specifically provide for by graphically indicating the understood context.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for providing context-based corrections of voice recognition results using an electronic client device, the method comprising the acts of:
   storing a plurality of element categories in a memory of the electronic client device;
   storing, in the memory, a plurality of recognized words and phrases corresponding to the plurality of element categories;
   displaying, by the electronic client device on a display, a text-based result from a speech-to-text conversion operation, wherein the result comprises a plurality of words;
   identifying, by the electronic client device, an element category associated with a portion of the text-based result, wherein said identifying the element category comprises the acts of:
      parsing the plurality of words to determine if at least one of the plurality of recognized words and phrases is contained in the text-based result,
      performing a lookup operation of the plurality of element categories using an identified one of the plurality of recognized words and phrases from said parsing, and
      identifying said element category from among the plurality of element categories in response to the lookup operation producing a match between one of the plurality of element categories and the identified one of the plurality of recognized words and phrases;
   displaying, by the electronic client device on the display, a graphical icon corresponding to the element category in an area of the display corresponding to where the portion of the text-based result is also displayed;
   detecting a user selection, by the electronic client device, of the graphical icon;
   enabling, by the electronic client device and in response to the user selection, an edit operation to be performed on the portion of the text-based result associated with the graphical icon; and
   displaying, by the electronic client device on the display, an updated version of the text-based result based on said edit operation.

2. The method of claim 1, wherein displaying, by the client device on the display, the graphical icon corresponding to the element category comprises displaying the graphical icon and the portion of the text-based result in an at least partially overlapping manner on the display of the client device.

3. The method of claim 1, wherein detecting the user selection comprises detecting a finger gesture on the display in an area corresponding to where the graphical icon is displayed.

4. The method of claim 1, wherein enabling the edit operation comprises activating an area of the display for text entry, wherein the area corresponds to where the portion of the text-based result is displayed.

5. The method of claim 4, wherein during the edit operation, the plurality of words of the text-based results that are outside the portion of the text-based result are uneditable.

6. The method of claim 1, further comprising transmitting, by the client device over a network, an electronic message comprising the updated version of the text-based result.

7. An electronic client device configured to enable context-based corrections of voice recognition results, the electronic device comprising:
   a display;
   a memory containing processor-executable instructions for enabling context-based corrections of voice recognition results; and
   a processor electrically coupled to the display and to the memory, the processor configured to execute the processor-executable instructions to:
      store, in the memory, a plurality of element categories;
      store, in the memory, a plurality of recognized words and phrases corresponding to the plurality of element categories;
      display, on the display, a text-based result from a speech-to-text conversion operation, wherein the result comprises a plurality of words,
      identify an element category associated with a portion of the text-based result,
      display, on the display, a graphical icon corresponding to the element category in an area of the display corresponding to where the portion of the text-based result is also displayed,
      detect a user selection of the graphical icon,
      enable, in response to the user selection, an edit operation to be performed on the portion of the text-based result associated with the graphical icon, and
      display, on the display, an updated version of the text-based based on said edit operation,
   wherein the processor is configured to execute the processor-executable instructions to identify the element category by further executing processor-executable instructions to:
      parse the plurality of words to determine if at least one of the plurality of recognized words and phrases is contained in the text-based result,
      perform a lookup operation of the plurality of element categories using an identified one of the plurality of recognized words and phrases from said parsing, and
      identify said element category from among the plurality of element categories in response to the lookup operation producing a match between one of the plurality of element categories and the identified one of the plurality of recognized words and phrases.

8. The electronic client device of claim 7, wherein the processor is configured to execute the processor-executable instructions to display the graphical icon by displaying the graphical icon and the portion of the text-based result in an at least partially overlapping manner on the display.

9. The electronic client device of claim 7, wherein the display is a touchscreen display and the processor is further configured to execute the processor-executable instructions to detect the user selection by detecting a finger gesture on the touchscreen display in an area corresponding to where the graphical icon is displayed.

10. The electronic client device of claim 7, wherein the display is a touchscreen display and the processor is further configured to execute the processor-executable instructions to enable the edit operation by activating an area of the touchscreen display for text entry, wherein the area corresponds to where the portion of the text-based result is displayed.

11. The electronic client device of claim 10, wherein during the edit operation, the plurality of words of the text-based results that are outside the portion of the text-based result are uneditable.

12. The electronic client device of claim 7, wherein the processor is further configured to execute the processor-executable instructions to transmit, over a network, an electronic message comprising the updated version of the text-based result.

13. A computer program product, comprising:
a processor readable medium having processor executable code embodied therein to enable context-based corrections of voice recognition results using an electronic client device, the processor readable medium having:
processor executable program code to store, in a memory of the electronic client device, a plurality of element categories;
processor executable program code to store, in the memory, a plurality of recognized words and phrases corresponding to the plurality of element categories;
processor executable program code to display, on a display of the electronic client device, a text-based result from a speech-to-text conversion operation, wherein the result comprises a plurality of words,
processor executable program code to identify an element category associated with a portion of the text-based result,
processor executable program code to display, on the display, a graphical icon corresponding to the element category in an area of the display corresponding to where the portion of the text-based result is also displayed,
processor executable program code to detect a user selection of the graphical icon,
processor executable program code to enable, in response to the user selection, an edit operation to be performed on the portion of the text-based result associated with the graphical icon, and
processor executable program code to display, on the display, an updated version of the text-based based on said edit operation,
wherein the processor executable program code to identify the element category further comprises:
processor executable program code to parse the plurality of words to determine if at least one of the plurality of recognized words and phrases is contained in the text-based result,
processor executable program code to perform a lookup operation of the plurality of element categories using an identified one of the plurality of recognized words and phrases from said parsing, and
processor executable program code to identify said element category from among the plurality of element categories in response to the lookup operation producing a match between one of the plurality of element categories and the identified one of the plurality of recognized words and phrases.

14. The computer program product of claim 13, wherein the processor executable program code to display the graphical icon further comprises processor executable program code to display the graphical icon and the portion of the text-based result in an at least partially overlapping manner on the display.

15. The computer program product of claim 13, wherein the display is a touchscreen display and wherein the processor executable program code to detect the user selection further comprises processor executable program code to detect a finger gesture on the touchscreen display in an area corresponding to where the graphical icon is displayed.

16. The computer program product of claim 13, wherein the display is a touchscreen display and wherein the processor executable program code to enable the edit operation further comprises processor executable program code to activate an area of the touchscreen display for text entry, wherein the area corresponds to where the portion of the text-based result is displayed.

17. The computer program product of claim 16, wherein during the edit operation, the plurality of words of the text-based results that are outside the portion of the text-based result are uneditable.

18. The computer program product of claim 13, wherein the processor readable medium further includes processor executable program code to transmit, over a network, an electronic message comprising the updated version of the text-based result.

* * * * *